C. W. PIERCE.

ROTARY STEAM BOILER.

No. 7,184. Reissued June 20, 1876.

WITNESSES:

C. Nereux

Alex F. Roberts

INVENTOR:

C. W. Pierce

BY

Munn & Co

ATTORNEYS.

N. PETERS, PHOTO-LITHOGRAPHER, WASHINGTON, D. C.

UNITED STATES PATENT OFFICE.

CHARLES W. PIERCE, OF NEW YORK, N. Y., ASSIGNOR TO THE PIERCE ROTARY TUBULAR BOILER COMPANY, OF SAME PLACE.

IMPROVEMENT IN ROTARY STEAM-BOILERS.

Specification forming part of Letters Patent No. 166,807, dated August 17, 1875; reissue No. 6,750, dated November 16, 1875; reissue No. 7,184, dated June 20, 1876; application filed May 1, 1876.

*To all whom it may concern:*

Figure 1:
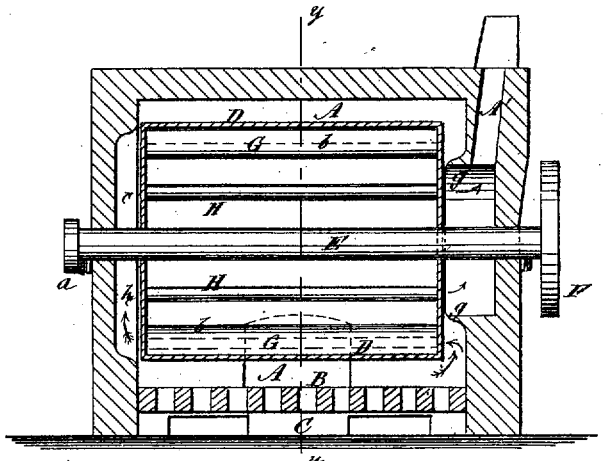
Figure 2:
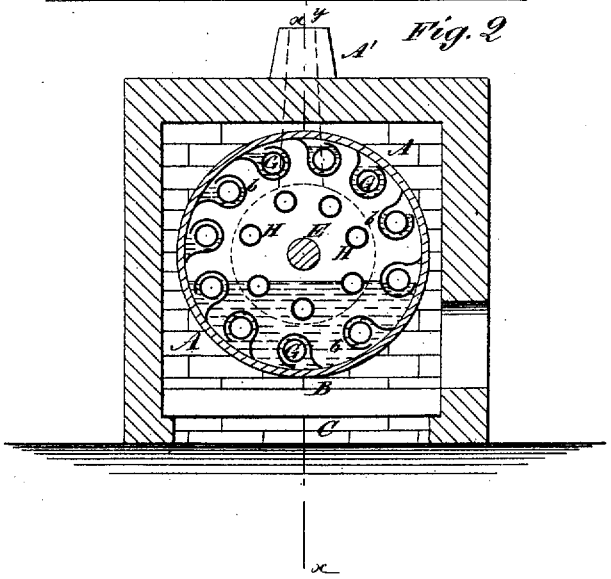

Be it known that I, CHARLES W. PIERCE, of the city, county, and State of New York, have invented a new and Improved Rotary Steam-Boiler, of which the following is a specification:

In the accompanying drawing, Figure 1 represents a longitudinal vertical section of my improved boiler, and Fig. 2 is a transverse vertical sectional view thereof.

The invention consists in certain novel features of construction and arrangement, by which a rotary steam-boiler may be improved, as hereinafter particularly described.

In the annexed drawings, A designates the furnace-chamber, which in form is rectangular; B the grate-bars, and C the ash-pit. D designates the boiler-shell, which is cylindrical and of any suitable length and diameter. Through the center of this boiler passes a tubular shaft, E, which is supported by anti-friction rollers *a a* outside of the furnace-chamber, and which has a spur-wheel, F, keyed to one end, that receives rotation from any convenient prime mover. G G designate a number of flue-tubes, which are arranged equdistant apart, within and concentrically around the axis of the boiler-shell. These flues are near the boiler-shell, and extend the whole length, and through both the heads of the boiler. They are open at the outward surface of the boiler-heads and throughout their whole length, and admit the flame and products of combustion to pass freely through them while the boiler is rotating. Each one of these flues is nearly encircled by a bucket, *b*, as shown in Fig. 2. These buckets *b* extend from one end to the other of the flues G, and are attached to the inner side of the cylindrical shell of the boiler.

When the boiler is rotated the buckets *b* will successively take up the water, and, during that part of the revolution which is performed above the water-line in the boiler, supply the water to the flues and to the boiler-shell, thereby preventing undue or unequal expansion thereof, and greatly facilitating the generating of steam.

Inside of the circle of tubes or flues G is another circle of tubes H, which, like the flues G, extend from one head to the other of the boiler, and pass through and are open at the outward surface of both, and are concentrically arranged around the shaft E, as shown in Fig. 2. These flues H are located sufficiently distant from the axis of the boiler to be wholly covered by the water in the lower part of their travel, the water-level being at the same time lower than the axis of the boiler, which is necessary to enable the steam to be taken out thereat.

At one end of the boiler there is an annular flange, *g*, formed on the interior of the furnace-wall, which flange surrounds a chamber leading into the chimney A′. At the opposite end of the boiler an annular chamber, *h*, is formed in the furnace-wall, which chamber is of the same diameter as the boiler, and communicates with the open ends of the tubes or flues G and H.

It will be seen that the flame and results of combustion will first pass through the flues G into the chamber *h*, and then return through the flues H into the chimney A′.

From the rotation of the boiler, and the current of heated air passing through the flues, it is obvious they are self-cleaning, and, from a similar cause, no sediment can collect and remain on the inner surface to corrode the shell of the boiler.

By these features of construction and operation economy and efficiency are combined in a high degree.

It is obvious that there must be a passage or passages between the hollow trunnions and the interior of the boiler for the admission of water and the escape of steam.

Having thus described my invention, what I claim as new, and desire to secure by Letters Patent, is—

1. Two sets of tubes or flues passing through the heads of the boiler and concentric with each other, in combination with the annular flange *g* and chamber *h*, whereby the products of combustion are caused to pass through the outer series and return through the inner series, substantially as herein shown and described.

2. The annular flange *g* and chamber *h*, in combination with the tubes G and H, substantially as herein shown and described.

3. The combination of the shell D, buckets *b*, flues G and H, chamber *h*, flange *g*, and chimney A′, constructed and operating substantially as herein shown and described.

CHARLES W. PIERCE.

Witnesses:

T. B. MOSHER,

ALEX. F. ROBERTS.